United States Patent
Sabo

(12)
(10) Patent No.: US 6,234,142 B1
(45) Date of Patent: May 22, 2001

(54) SHROUDED ENGINE VALVE

(76) Inventor: Rudolph G. Sabo, 6243 Tanglewood St., Lakewood, CA (US) 90713

( * ) Notice: Subject to any disclaimer, the term of this patent is extended or adjusted under 35 U.S.C. 154(b) by 0 days.

(21) Appl. No.: 09/546,978

(22) Filed: Apr. 11, 2000

(51) Int. Cl.$^7$ .............................. F02B 31/00; F02N 3/00
(52) U.S. Cl. ...................................... 123/306; 123/188.2
(58) Field of Search ................... 123/306, 188.2, 123/188.3

(56) References Cited

U.S. PATENT DOCUMENTS 4,119,064 * 10/1978 Klomp ................... 123/260

FOREIGN PATENT DOCUMENTS 681 117 * 9/1939 (DE) ................................ 123/306

* cited by examiner

*Primary Examiner*—Noah P. Kamen
(74) *Attorney, Agent, or Firm*—Henry M. Bissell; Henry M. Bissell, IV

(57) ABSTRACT

A shrouded engine valve having a shroud wall so as to direct and swirl a mixture of fuel and air into a combustion chamber of an internal combustion engine. The arrangement of the invention improves the efficiency of combustion and thereby engine performance. The shrouded engine valve may be manufactured as a single unit, or with a multiple piece design.

10 Claims, 4 Drawing Sheets

SHROUDED ENGINE VALVE

BACKGROUND OF THE INVENTION

1. Field of the Invention

This invention relates generally to valves used in internal combustion engines and, more particularly, to overhead valves especially shaped to enhance fuel and air mixing for improved combustion efficiency and engine performance.

2. Description of the Related Art

Internal combustion engines are well known in a wide variety of configurations and applications. A long series of refinements have been applied in efforts to improve the performance of such engines. Much attention has been focused on improving the efficiency of combustion of the fuel and air mixture within the cylinder's combustion chamber.

A number of approaches have been tried in order to obtain increased engine performance, either alone or in combination. Specially shaped combustion chambers, increased number of valves per cylinder, specially shaped piston faces, and a wide variety of spark plug positions and configurations have all been explored and used with varying degrees of success.

Since the invention of the internal combustion engine, a significant amount of attention has been directed to the improvement of valve design. The valves that control the flow of the intake and exhaust charges in most engines are of the poppet type, which means that they move in and out of the valve ports in order to open and close the passage. During operation of the conventional internal combustion engine, cams on a rotating camshaft operate to lift the tappets, which in turn lift the pushrods and actuate the rocker arms, which push down on the tips of the valves. When this happens, the valves are lifted off their seats and allow either intake or exhaust gases to flow in or out of the combustion chamber.

In efforts to improve airflow into and out of the combustion chamber, various aspects of the valves have been modified in a variety of ways. Many of these valve shape modifications affect engine performance, but no one particular design necessarily performs better than another. Rather, a particular valve design complements a given port of a given head in order to produce the best flow. For example, Chrysler's famous "Hemi" engine incorporated a valve that resembled a tulip bulb at the valve fillet. It was Chrysler's opinion that this shape maximized flow through the intake ports of the heads used on those engines.

Various valve designs have addressed different portions or features of the overall valve. The angle of the valve face and the angle of the valve seat have frequently been varied, either independently or in cooperation. "Top cut" angles and "bottom cut" angles on either side of the valve seat formed in the engine head have been varied to improve performance. Valve stems have been "necked down" in the portion of the stem that will occupy the port, in order to reduce flow restriction and, further, to reduce slightly the weight of the valve. Stem lengths have been varied in order to accommodate different engine head thicknesses or to avoid coil bind in the valve spring. The height of the valve margin, or thickness of the valve head, has also been varied in efforts to improve flow.

As can be discerned from the above discussion, much time and effort have been directed to improve flow past engine valves. Other efforts have been directed at designing improved piston faces that will "swirl" the contents of the combustion chamber during the compression stroke and thereby improve combustion efficiency. Spark plug position and spark plug design have also been used to improve efficiency of combustion.

SUMMARY OF THE INVENTION

In brief, particular arrangements in accordance with the present invention provide a modified engine valve for use in internal combustion engines. The modification comprises the addition of a shroud in the form of a wall extending from the inner face of the intake valve and partly around the circumference thereof. More particularly, the shrouded engine valve of the present invention may be used to significantly improve the efficiency of combustion and thereby the performance of an engine. The shrouded valve is installed and positioned such that the shroud wall serves to direct and swirl into the combustion chamber the mixture of fuel and air. Swirling the fuel and air mixture within the combustion chamber develops increased combustion efficiency and thereby better engine performance.

By positioning the shrouded valve of the present invention such that the opening in the shroud wall is located toward the piston (i.e., generally toward the center of the cylinder) for maximum efficiency, the flow of the fuel-air mixture is swirled into the combustion chamber on the engine's intake stroke as the intake valve opens and the mixture is drawn into the cylinder past the intake valve. In accordance with one particular aspect of the invention, the circumferential extent and/or height of the shroud wall may be varied to achieve the best performance in different types of engines. In one particular engine on which performance tests of my shrouded valves have been run, the engine was a 350 cubic inch V-8, the shroud was approximately one-half inch in height and extended 220° about the periphery of the valve.

The results of smog emission tests are shown on the following table which shows the emissions of various constituents for a 350 cubic inch V-8 Chevrolet engine equipped with standard valves and for the same engine equipped with shrouded valves of the present invention, taken at 850 and 2500 revolutions per minute (rpm), respectively. With standard valves, the engine was tested with standard smog equipment. In the test of the shrouded valve engine, the engine was not equipped with either a catalytic converter or other smog equipment.

| 350 V-8 Chevrolet | SMOG EMISSION TEST | | | | | | |
|---|---|---|---|---|---|---|---|
| | HC | CO | NO | $CO^2$ | $O^2$ | RPM | REMARKS |
| Standard Valve | 220 | 2.0 | | | | 850 | |
| | 180 | 1.7 | | | | 2500 | |
| Shrouded Valve | 189 | 1.70 | 54 | 11.0 | 4.12 | 850 | No Smog Equipment |
| | 80 | .49 | 78 | 10.0 | 5.17 | 2500 | No Smog Equipment |

HC—Hydrocarbons, PPM (parts per million)
CO—Carbon monoxide (percent)
NO—Nitric oxide, ppm (parts per million)

Tests were also performed in the test automobile, a Model A Ford with 350 cubic inch V-8 engine conversion, under ordinary driving conditions. On the street, fuel consumption was 8.59 miles per gallon (mpg) whereas in freeway driving for approximately 40 miles the fuel consumption was 14.75 mpg.

The advantages of the present invention are numerous and varied. The configuration of the shrouded engine valve develops a vortex swirling the fuel and air mixture, thereby increasing the efficiency of combustion. This increased efficiency of combustion translates into smoother idle performance with lower exhaust temperature, reduced fuel consumption, and reduced exhaust emissions of the kind that result from incomplete burning of the fuel air mixture. In a smog test conducted on the 350 cubic inch V-8 engine equipped with shrouded valves in accordance with the present invention, installed in a Model A Ford, it was found that the engine met the 1998 standards of the State of California without either a catalytic converter or an air pump, accessories which have been customarily used in various engines to develop more complete combustion of the fuel-air mixture with lower levels of smog constituents in the exhaust. This clearly demonstrates the efficacy of the present invention as it relates to improvement of internal combustion engine emissions.

In the operation of the engine on a test stand, to test for fuel efficiency, the engine equipped with the shrouded valves was clearly more fuel efficient than the engine without the shrouded valves. This test was under no-load conditions. The conventional valve engine ran for 4.6 minutes on 16 oz. of gasoline. The shrouded valve engine ran for 6.8 minutes on 16 oz. of gasoline, an improvement in efficiency of 48%.

Structurally, the shrouded engine valve of the present invention provides a simple and inexpensive means for greatly improving the performance of internal combustion engines. In one embodiment, the invention incorporates a two-piece design, although unitary manufacture is contemplated.

In one particular embodiment of the invention, a two-piece configuration comprises a central valve portion and an encircling shroud portion. The central valve portion may be modified from a conventional valve by decreasing the diameter of the valve head and by adapting the valve face and margin to receive and secure the shroud portion. The shroud portion has a generally cylindrical shroud wall opposite the valve face. The shroud wall subtends a portion of a generally circular shape axially aligned with the valve stem. The shroud portion contains the radially outward section of a conventional valve; namely, the face and margin and the outer periphery of the valve head. In an alternative embodiment, the shroud wall is attached to the stem side of the valve head, as by welding or by integral fabrication therewith, such that the shroud wall surrounds the valve fillet at a selected constant radius from the valve axis and subtends an angle significantly less than 360° but more than 180°. The open space between the terminal ends of the shroud wall defines a desired flow area for the fuel-air mixture entering the cylinder.

BRIEF DESCRIPTION OF THE DRAWINGS

A better understanding of the present invention may be realized from a consideration of the following detailed description, taken in conjunction with the accompanying drawings, in which.

DESCRIPTION OF THE PREFERRED EMBODIMENTS

Embodiments of the present invention will hereinafter be described with reference to the drawings.

Figure 1:
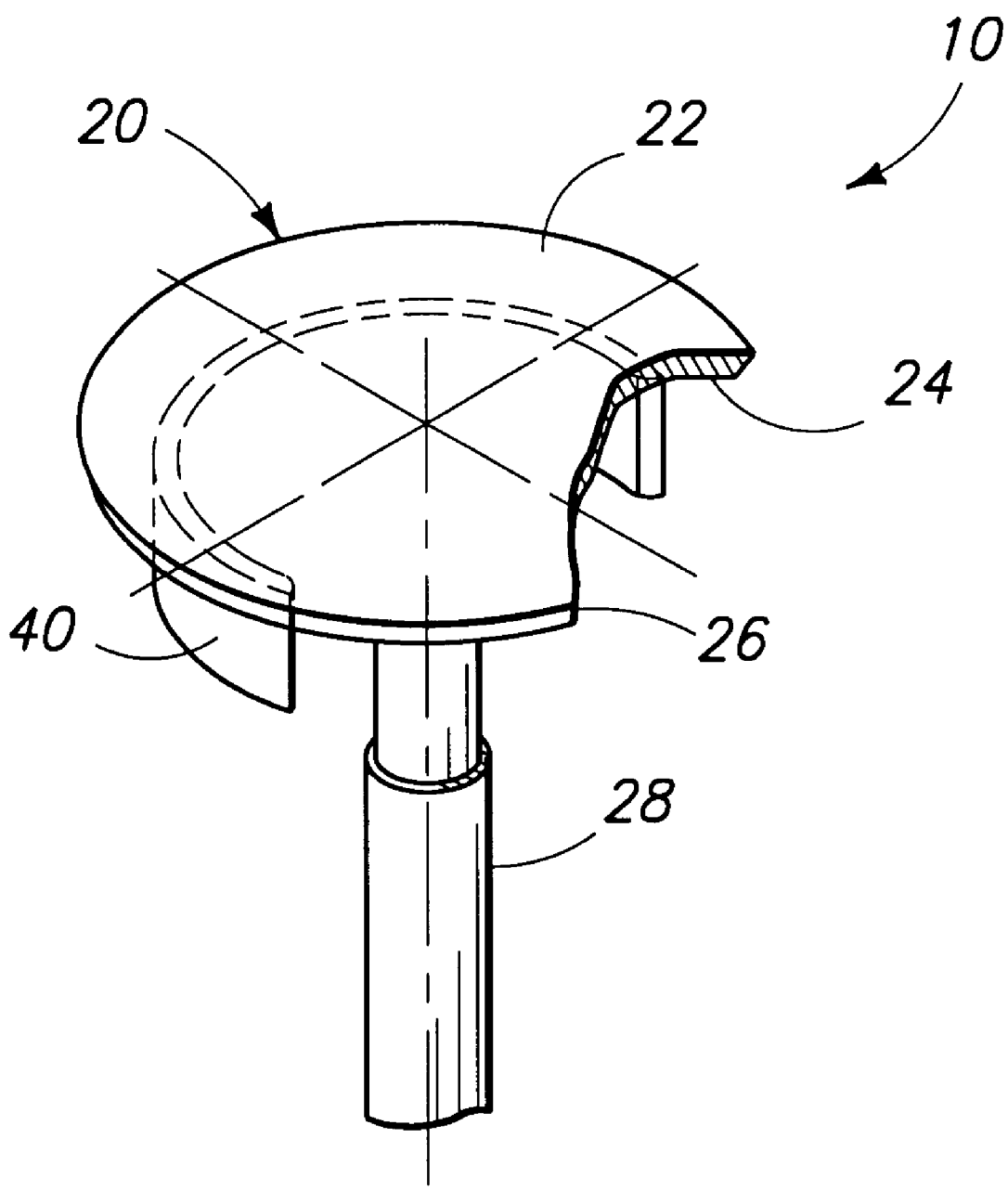
FIG. 1 is an isometric view, partially broken away, of a shrouded valve in accordance with one particular arrangement of the present invention.
Figure 2:
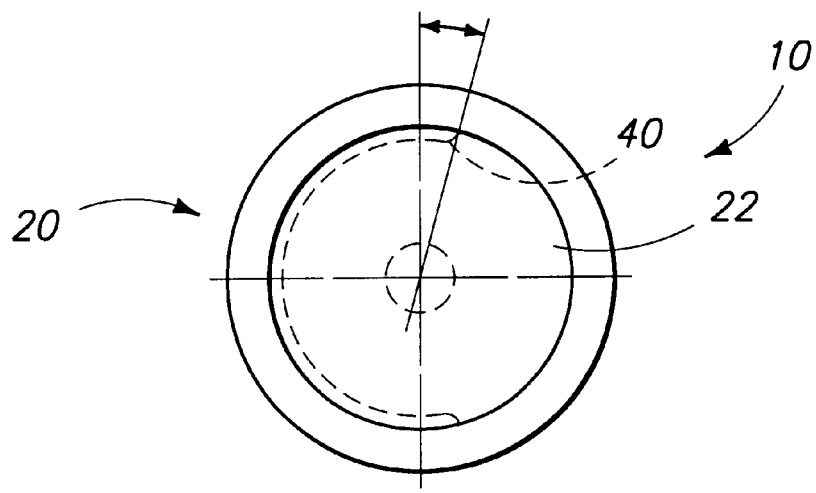
FIG. 2 is a plan view of the arrangement of FIG. 1, taken from the upper side of the valve as oriented in FIG. 1 with the broken line outline indicating the position of the shroud.
Figure 3:
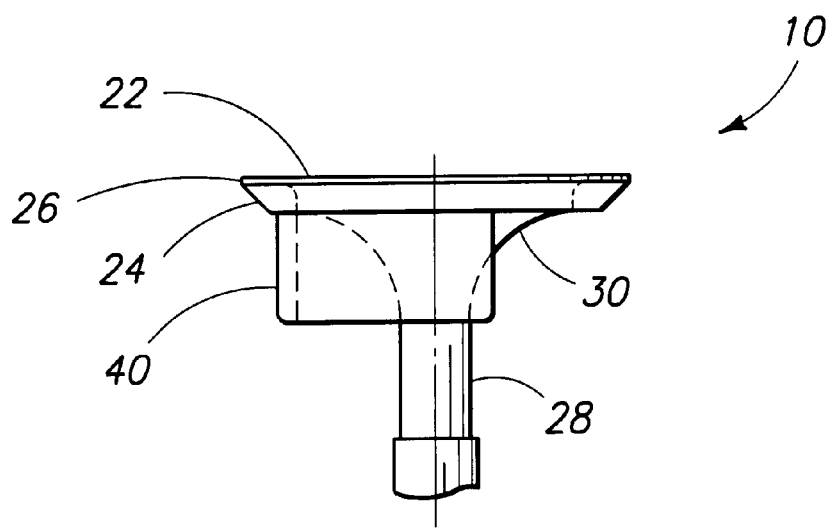
FIG. 3 is a side elevational view of the arrangement of FIGS. 1 and 2.

First Embodiment: FIGS. 1–3

FIG. 1 of the accompanying drawings shows a shrouded engine valve 10 according to a first embodiment of the present invention. A modified valve 20 includes a valve head 22 oriented perpendicular to and affixed opposite valve stem 28. A valve fillet 30 (FIG. 3) provides a transition between, and securing of, valve stem 28 to valve head 22. A valve face 24 surrounds the circumference of valve fillet 30, and is oriented at an angle thereto. Valve margin 26 extends between valve face 24 and valve head 22. Valve margin 26 allows for valve wear, and provides adequate material to enable the valves to be ground once or twice during engine rebuilding. Shroud wall 40 extends from the inner face of the intake valve and partly around the circumference thereof. Shroud wall 40 subtends a portion of a generally circular shape about valve fillet 30 at or near the transition to valve face 24, and axially aligned with valve stem 28.

As shown in FIG. 2, shrouded engine valve 10 comprises a modified valve 20, as modified through the addition of shroud wall 40 affixed to valve fillet 30 and having an opening facing the piston (i.e. toward the center of the cylinder).

As shown in FIG. 3, shrouded engine valve 10 has a shroud wall 40 formed adjacent and partially circumferentially surrounding valve fillet 30. Shroud wall 40 is attached to the side of the valve head 22 from which extends valve stem 28. Shroud wall 40 surrounds valve fillet 30 at a selected constant radius from valve stem 28, and subtends an angle partially encircling valve stem 28.

Second Embodiment: FIGS. 4–7

Figure 4:
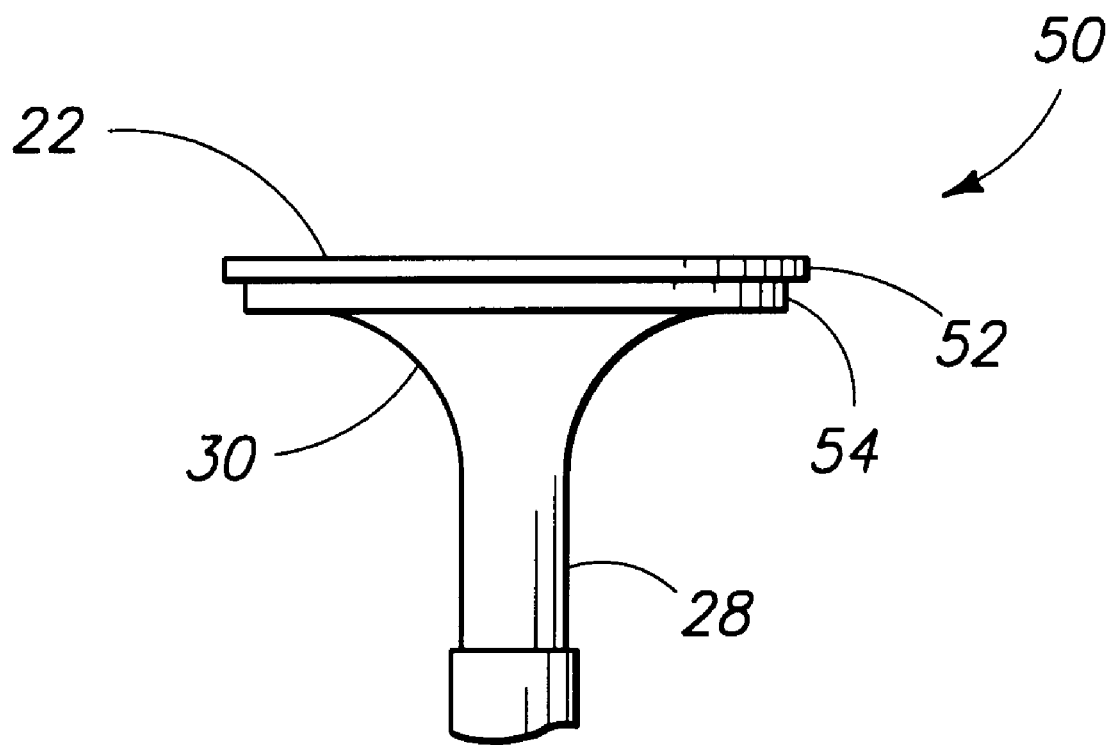
FIG. 4 is a side elevational view of a valve modified for inclusion in a two-piece valve configuration, a second particular arrangement of the present invention.

FIG. 4 illustrates a second embodiment according to the present invention. A central valve portion 50 has modified face 54 adjacent valve fillet 30 transitioning from stem 28 to valve head 22. Modified face 54 is formed adjacent an annular flange 52. Annular flange 52 and adjacent modified face 54 extend circumferentially about valve head 22.

Figure 5:
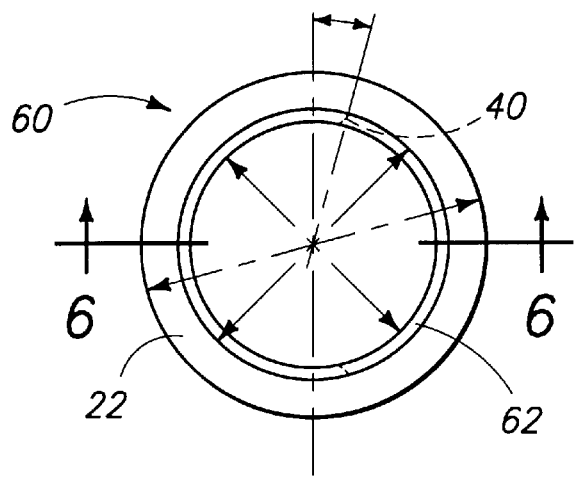
FIG. 5 is a plan view, corresponding to FIG. 2, of the shroud portion of a two-piece valve configuration.

FIG. 5 depicts shroud portion 60. Shroud portion 60 provides a circumferential extension valve head 22. Within and adjacent the circumferential extension of valve head 22 is formed an annular lip 62. Annular lip 62 is recessed within valve head 22 for receiving and securing central valve portion 50.

Figure 6:
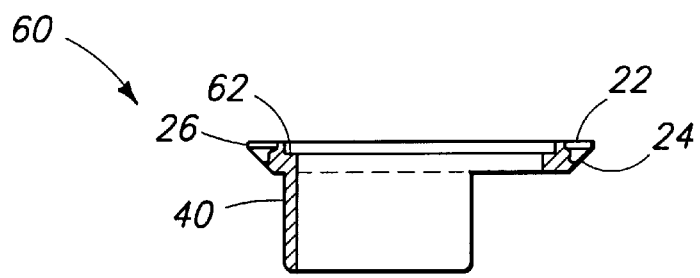
FIG. 6 is a side elevational view of the shroud portion of FIG. 5.

FIG. 6 depicts shroud portion 60 having a circumferential extension of valve head 22 containing valve margin 26 adjacent valve face 24. Annular lip 62 is recessed within valve head 22 for receiving central valve portion 50 and engaging annular flange 52 and modified face 54 thereof. Shroud wall 40 has a generally cylindrical shape and is formed on the side of valve head 22 adjacent valve face 24. Shroud portion 60 contains a radially outward section of a conventional valve, namely, valve face 24 and valve margin 26 and outer periphery of valve head 22.

Figure 7:
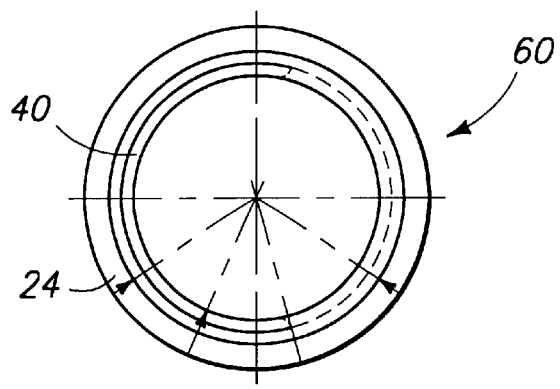
FIG. 7 is a plan view of the shroud portion of FIG. 6 taken from the shroud wall side of the valve.

FIG. 7 depicts another view of shroud portion 60. In this view valve face 24 is formed outward of and circumferentially extending about shroud wall 40. Shroud wall 40 subtends a portion of a generally circular shape and is axially aligned with valve stem 28 of central valve portion 50.

Although there have been described hereinabove various specific arrangements of a SHROUDED ENGINE VALVE in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as disclosed herein.

What is claimed is:

1. A shrouded engine valve comprising:
   a valve stem;
   a valve head attached to one end of the valve stem;
   a fillet formed between valve stem and valve head;
   a face surrounding the fillet;
   a margin between the face and the valve head; and
   a shroud wall extending partially around the fillet and depending therefrom;
   the valve further including a circumferential extension of said valve head formed as a separate component to be assembled with said valve head, said circumferential extension having a recessed annular lip for receiving and securing a mating portion of said valve head.

2. The intake valve of claim 1 wherein said shroud wall surrounds said fillet at a selected constant radial distance from the valve stem.

3. The shrouded engine valve of claim 1 wherein said shroud wall partially surrounds said fillet at a constant radius from the valve stem.

4. The shrouded engine valve of claim 1 wherein said shroud wall defines an opening situated at a predetermined circumferential position along said wall.

5. The intake valve of claim 4 wherein said opening extends less than 360° but more than 180° about the valve stem.

6. The intake valve of claim 5 wherein the angular extent of said opening is significantly less than 360° but not less than 180°.

7. The intake valve of claim 6 wherein said angular extent is approximately 220°.

8. The shrouded engine valve of claim 1 wherein said valve head is formed with a modified face joined to an annular flange, said modified face and flange being shaped to mate with the shape of the said recessed annular lip.

9. The shrouded engine valve of claim 8 wherein said shroud wall extends from said circumferential extension in a direction coaxial with said valve stem when the two portions of said valve are assembled together.

10. The shrouded engine valve of claim 9 wherein said assembled modified valve head and circumferential portion with depending shroud wall direct air in a swirling motion in an associated chamber in which the valve is mounted.

* * * * *